Figure 1:
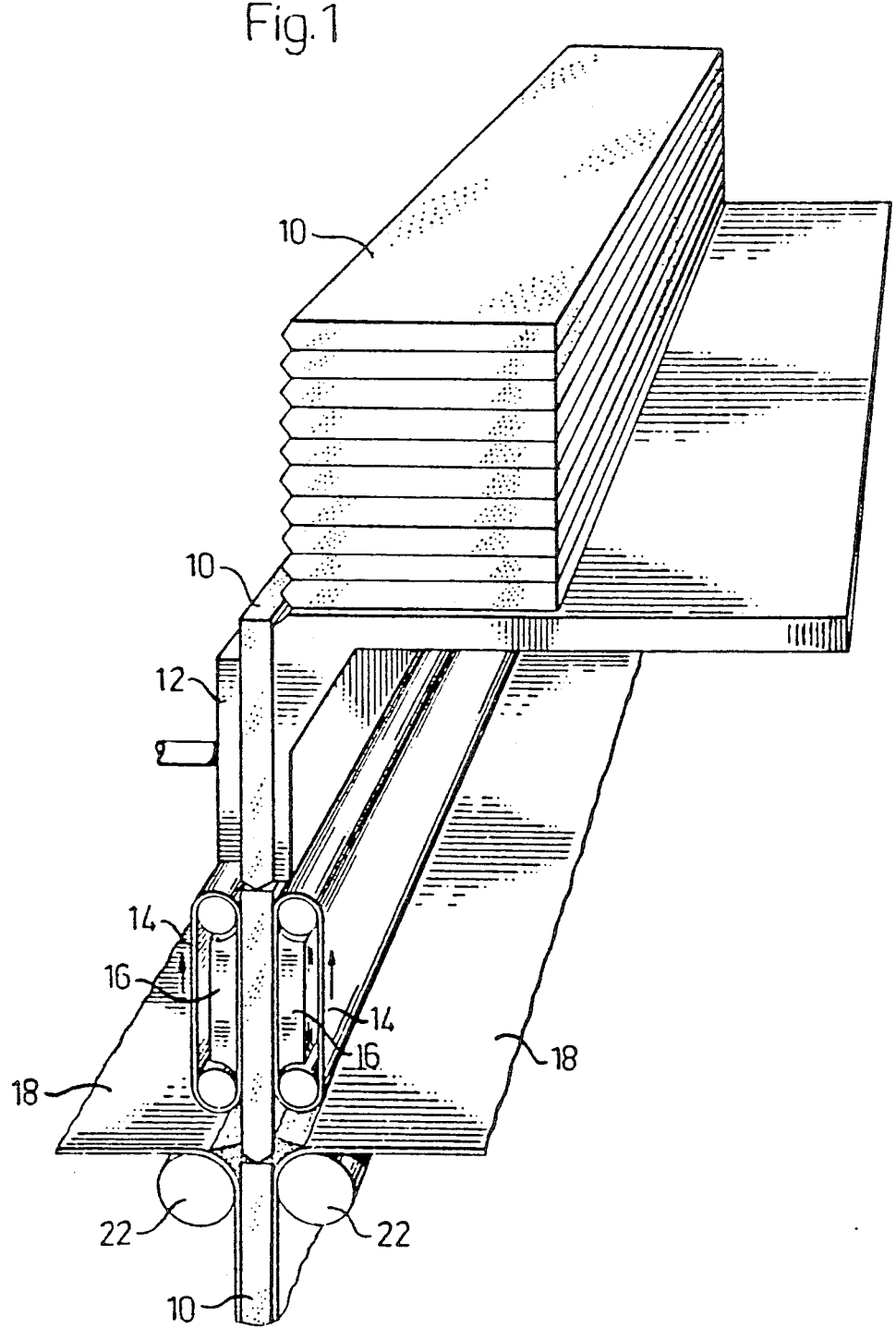

United States Patent [19]

Svensson et al.

[11] Patent Number: 5,114,524

[45] Date of Patent: * May 19, 1992

[54] METHOD FOR THE VERTICAL MANUFACTURE OF SANDWICH STRUCTURAL ELEMENTS

[76] Inventors: Paul Svensson, Krokusvagen 2, Laholm, Sweden, 312 31; Christer Nilsson, Aleden 28, Laholm, Sweden, 312 00; Jan Bäcklund, Skyttevagen 6, Lidingo, Sweden, 181 46; Karl G. Ericsson, Verkmastargatan 62, Enkoping, Sweden, 199 33; Leif Jilkén, Blamesvagen 13, Sundsvall, Sweden, 852 55; Harry Kihlberg, Kaptensgatan 8, Saffle, Sweden, 661 00

[*] Notice: The portion of the term of this patent subsequent to Oct. 9, 2007 has been disclaimed.

[21] Appl. No.: 554,899

[22] Filed: Jul. 20, 1990

Related U.S. Application Data

[62] Division of Ser. No. 246,309, Sep. 9, 1989, Pat. No. 4,961,810.

[30] Foreign Application Priority Data

Mar. 27, 1986 [SE] Sweden .................... 8601441

[51] Int. Cl.⁵ .................... B32B 31/08; B32B 31/12
[52] U.S. Cl. .................... 156/295; 156/324; 156/549; 156/550
[58] Field of Search .................... 156/324, 549, 550, 551, 156/87, 286, 295, 197, 555; 52/309.11; 428/178

[56] References Cited

U.S. PATENT DOCUMENTS

| | | | |
|---|---|---|---|
| 1,195,408 | 8/1916 | Smith | 156/550 |
| 3,888,716 | 6/1975 | Morse | 156/324 X |
| 4,161,815 | 6/1979 | Land et al. | 156/324 X |
| 4,961,810 | 10/1990 | Svensson et al. | 156/295 |

Primary Examiner—Michael W. Ball
Assistant Examiner—Michele K. Yoder
Attorney, Agent, or Firm—Dowell & Dowell

[57] ABSTRACT

Method and apparatus for manufacturing so-called sandwich structural elements in laminated materials, where a core (10) is provided with a covering layer (18) on at least one side. The core in the form of a solid or expandable material is advanced from above and downwards in a substantially vertical path, and the covering layer or layers (18) are pressed against, and joined to the core during continued vertical advance thereof from above and downwards.

4 Claims, 3 Drawing Sheets

METHOD FOR THE VERTICAL MANUFACTURE OF SANDWICH STRUCTURAL ELEMENTS

This application is a division of application Ser. No. 07/246,309, filed Sep. 9, 1989, now U.S. Pat. No. 4,961,810.

The present invention relates to a method of manufacturing structural elements in laminated material, so-called sandwich elements, in which a core material is provided with a covering layer on at least one side.

It is customary to produce such elements, by adhering to the core, which is of cellular plastics or other suitable material and advanced horizontally, the covering layer, which is of plastics, sheet metal or other suitable material. In such sandwich structures, produced by adhering cores and covering layers, there are problems due to the air or other gas being trapped in the surface cells of the upper and lower sides of the core material. Seen in magnification, these cells appear as approximately hemispherical depressions. When the upper surface of the core is wetted by adhesive, surface tension in the latter causes a lid to form over the surface cell, and large amounts of air or other gas are trapped under the lids. Since the core materials normally used are proof against diffusion the trapped gas can not depart from the underside of the core either. On the other hand, if a core with diffusion properties is used, this only moves the source of the problem from the upper to the underside of the core without eliminating the described entrapment of gas. During the curing or hardening process the encapsulated gas may remain in the surface cell and reduce adhesive contact with the cellular plastics, mix with the adhesive to give the latter a porosity considerably reducing its strength, or diffuse through it to lie as a gas film between adhesive and covering layer, thus eliminating contact between the two.

The described problem results in that the adhesive and the adhesive grip on the core or covering material can be reduced by up to 90%. For heavy static or dynamic loading or heat stresses, e.g. from solar radiation or cleaning at an increased temperature, in such a structural element there will be delamination somewhere in the adhesive layer between covering layer and core due to the air or other gas encapsulations, even though the covering layer, adhesive and core material are each sufficiently strong, suitable and well-prepared for the structural adhesion in question.

In curing or hardening processes that generate heat the encapsulated air or gas will also be heated and thus caused to expand. There is then a very great risk that the lamination is disturbed in a very sensitive stage in its fixed position against the core, and the adhesive joint will thus be partially or totally inhibited over large surfaces.

In the known horizontal processes, a solution to these problems has been attempted by laminating one side of the core at a time, thus requiring it to be turned over between lamination steps. Another method would be to remove the gas by chemical methods. However, these solutions afford unsatisfactory results, and they also make the manufacturing process more expensive and consequently the finished product. Nor is it possible with the known processes to provide a continuous manufacturing process that gives an adhesive joint between diffusion-proof cores and covering layers which is free from air or gas.

The main object of the present invention is to provide a method and apparatus for the continuous production of a sandwich structural element where the above-described disadvantages with known processes are eliminated.

This object is achieved in accordance with the invention by proceeding in a completely different way than in the known manufacturing methods and as described in the characterising portions of the following claims.

Figure 2:
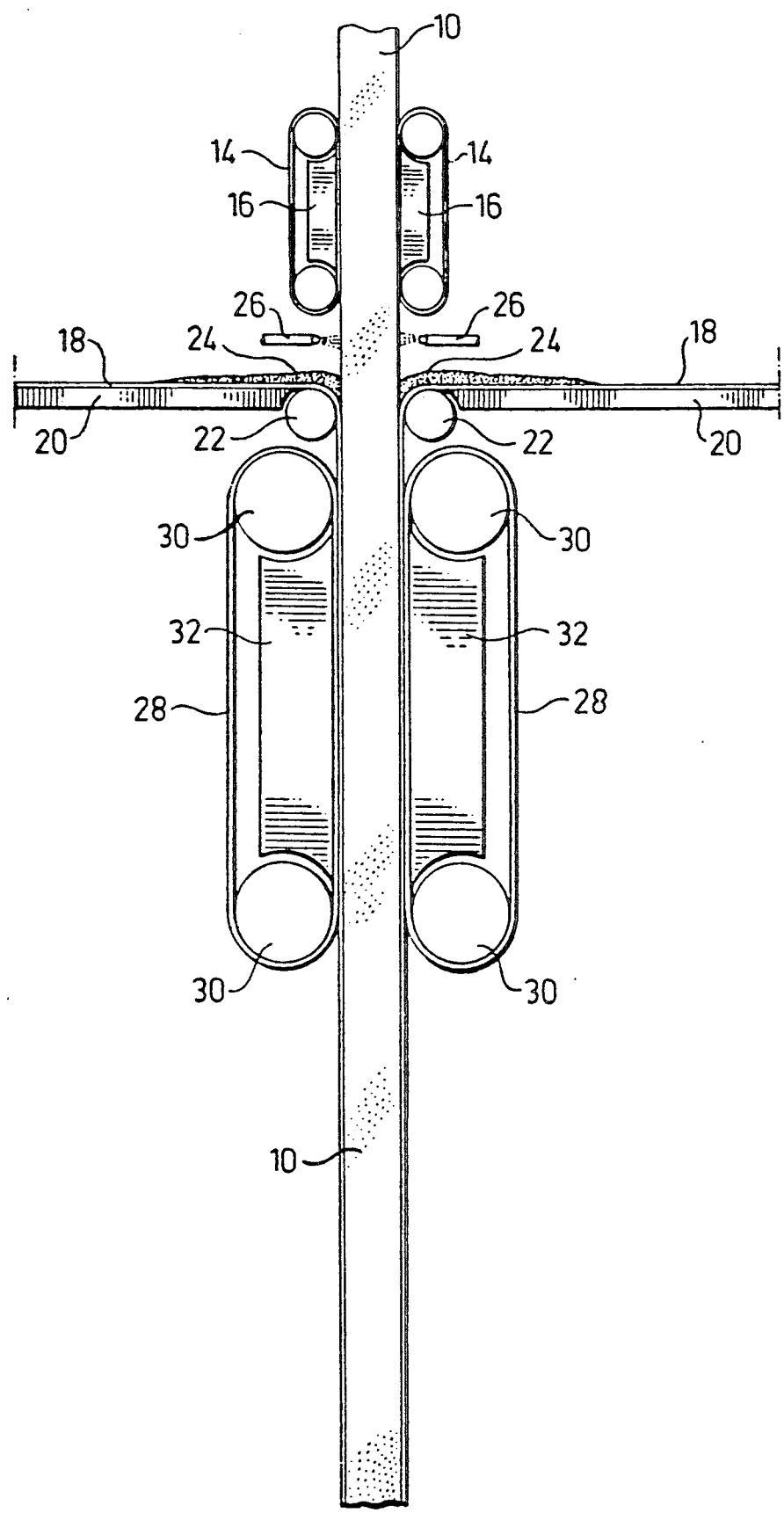
Figure 3:
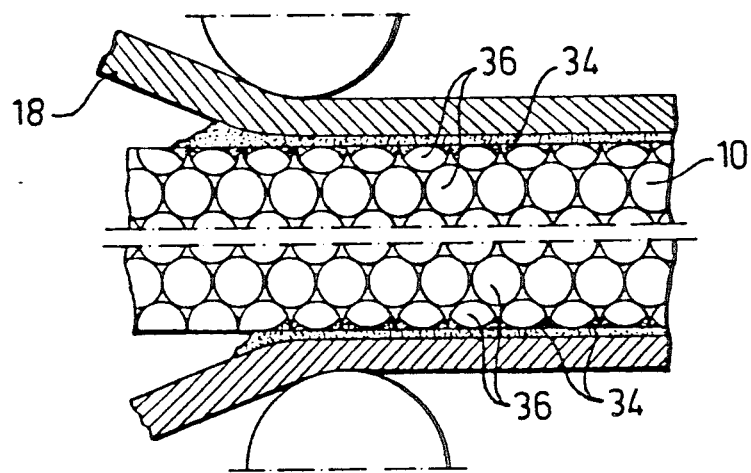
Figure 4:
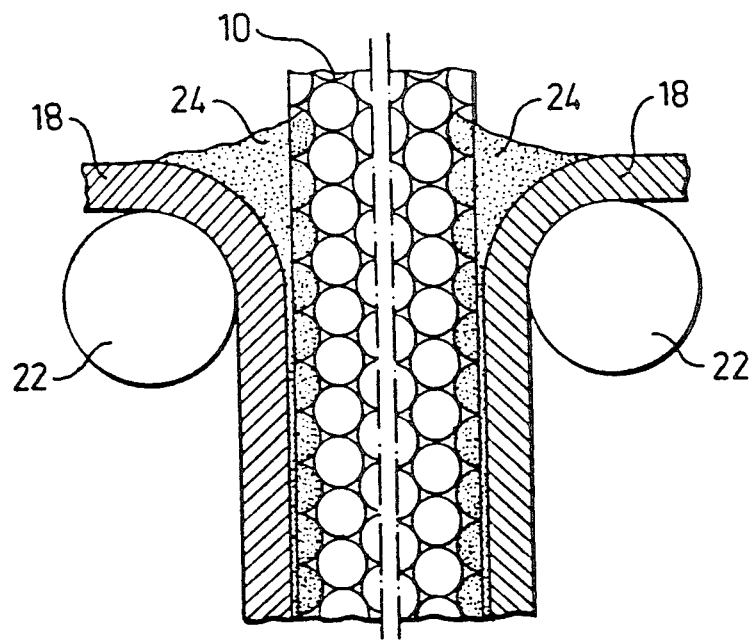

The invention, together with further advantages pertaining to it will be apparent from the following description of a plant for carrying out the method, and with reference to the accompanying drawings, on which FIG. 1 is a perspective view of a plant in accordance with the invention, FIG. 2 is a schematic side view of the lower part of the plant in FIG. 1, FIG. 3 illustrates a detail to a larger scale of the laminate in a known horizontal-type process, FIG. 4 illustrates a detail similar to the one in FIG. 3, but for the process according to the invention. The same reference characters have been used for the same parts in the different figures.

As will be seen from FIGS. 1 and 2, the problems described in the introduction have been solved by advancing the core vertically, with the covering material being supplied to the core in a process with vertical advance from the top and downwards. The core, denoted by 10, e.g. cellular plastics, is supplied in slabs of desired size by such as at mechanical turning and collecting device 12 to a delivery station. This station comprises a pair of advancing belts 14, one part of the belt being urged by its respective pneumatic bolster plate 16 against the core such as to delivery the core to an application station.

In the application station the core meets the covering layer 18, which may be of glass fibre reinforced plastics, metal sheets etc. The covering layers are supplied via heated tables 20 and press rolls 22, which deflect the covering layers in a downward direction while urging them towards the core 10. Before contact with the core the layers 18 are given a coating of adhesive on their sides facing towards the core. This adhesive forms a pool 24 at the nip between the core and the layers 18 in the vicinity of the rolls 22, as can be seen from FIG. 2. The core can also be wetted by adhesive material, as is schematically illustrated by the nozzles 26 in FIG. 2. In the illustrated embodiment, two belts 28 are arranged with the aid of their respective bolsters to press against the layers 18 and keep them in contact with the core 10 during hardening. Unillustrated heating elements are conventionally arranged for the hardening process.

The laminating process carried out in accordance with the invention entirely eliminates the problems with air or gas encapsulated in the surface pores of the core. In the known horizontal process the adhesive 34 will, as illustrated in FIG. 3, form a lid over the cell 36 to entrap the air under it. Since the core material is generally diffusion-proof, the gas can not migrate to the underside of the core 10, which would be to no purpose either, because this side is also provided with a covering layer enclosing the air or gas. In contradistinction to the conventional process, the adhesive, e.g. polyester, in the inventive process will form a pool 24 at the nip between core 10 and layer 18, as previously described, and this pool will result in that adhesive will flow into, and fill the surface cells of the core, as illustrated in FIG. 4. In this case, any gas can freely depart upwardly and outwardly above the polyester pool 24, and thus there is no risk that there will be gas encapsulations in the core material 10. If so desired, supersonic or other conventional technique may be used to assist in driving out any gas from the cells. What is essential here is that in the vertical process in accordance with the invention, the gas is enabled to depart from the core material 10 before the covering layer 18 is applied. Since the cells are filled simultaneously as the gas is forced out, the gripping surface between adhesive and core material will be increased many times, and there is no risk of delamination if the adhesive and core material each has the right quality.

In the production of structural elements in accordance with the inventive process there is also the possibility of reducing the viscosity of the adhesive by tempering it to reduce surface tension and make the hardening process quicker. A quicker hardening process results in the reduction of possible attack on the core material, in the case of styrene on PVC cellular plastics, for example.

The manufacture of sandwich structural elements by the vertical process in accordance with the invention may also be applied when cellular plastics is foamed or extruded in situ between two covering layers 18. The vertical principle signifies that there is no top or bottom side, which affords a completely homogenous cellular structure. Gas formations and air encapsulations can be easily and continuously led away upwards in obeyance of physical laws, since the process proceeds from the top and downwards.

In the vertical process, when it is decided to produce directly laminated sandwiches, there is also achieved that the covering layers thereof can be built up completely symmetrically. An upper and a lower side, with differentiated fibre orientation etc. is not obtained, as is with the horizontal process. In the manufacture of directly laminated, fibre reinforced plastic sandwiches it is also important that hardening takes place symmetrically on both sides so as to avoid shrinkage problems, which would cause the finished sandwich to be warped. The inventive vertical process also affords ideal conditions for symmetrical hardening the covering layers, even where they have been given different thicknesses.

The vertical process, from the top and downwards, also provides other advantages such as:

simple material advance with the aid of gravity, simple arrangement of process ventilation and small environmental problems with regard to repairs and inspection, simplified quality control, low investment cost due to mechanically simple process solutions, low operating costs.

The illustrated and described embodiment is of course merely one example of how to realise the invention, and it may be modified and varied within the scope of the following claims. Thus, even if the description relates to a sandwich having a core material with covering material on both sides, the core material may also be arranged to have covering material on only one side.

We claim:

1. A method of manufacturing sandwich structural elements in laminated material where a cellular core material having open surface cells on at least one side thereof is given a covering layer over each of the surface cells and wherein the core material is impervious to the passage of gases therethrough comprising the steps of:
   a. conveying the core material generally vertically so that the open surface cells along at least one side of the core material are oriented generally horizontally;
   b. conveying the covering layer laterally toward the open surface cells along at least one side of the core material and then vertically toward a flush engagement against the surface cells along said at least one side of the core material so as to form a nip area in the region where the covering engages the core material.
   c. applying an excess of liquid adhesive into the nip area in an amount which is sufficient to fill the open surface cells being conveyed through the nip area to thereby remove any gas therefrom by allowing the liquid adhesive to expel the gas vertically from each of the surface cells so that the surface cells are completely filled with liquid adhesive prior to the covering layer being brought into engagement therewith; and
   d. thereafter pressing the covering layer against the core material as the liquid adhesive is hardening so as to close each of the surface cells which are completely filled with the liquid adhesive so that substantially no gas is trapped between the covering layer and the core material.

2. The method of claim 1 including the additional step of supplying the liquid adhesive to the covering layer as it is being conveyed toward the core material so as to create a pool of adhesive in the nip area.

3. The method of claim 1 including the additional step of applying the liquid adhesive directly to the open surface cells of the core material prior to the cells being conveyed to the nip area.

4. The method of claim 1 in which the liquid adhesive is tempered so as to reduce its viscosity.

* * * * *